(12) United States Patent
Ritchie et al.

(10) Patent No.: US 11,171,848 B2
(45) Date of Patent: Nov. 9, 2021

(54) NETWORK SWITCH

(71) Applicant: Veracity UK Limited, Prestwick South Ayrshire (GB)

(72) Inventors: David Ritchie, Prestwick South Ayrshire (GB); Alastair McLeod, Prestwick South Ayrshire (GB)

(73) Assignee: Veracity UK Limited, Prestwick Strathclyde (GB)

( * ) Notice: Subject to any disclaimer, the term of this patent is extended or adjusted under 35 U.S.C. 154(b) by 280 days.

(21) Appl. No.: 15/773,935

(22) PCT Filed: Nov. 3, 2016

(86) PCT No.: PCT/GB2016/053414
§ 371 (c)(1),
(2) Date: May 4, 2018

(87) PCT Pub. No.: WO2017/077303
PCT Pub. Date: May 11, 2017

(65) Prior Publication Data
US 2018/0324065 A1    Nov. 8, 2018

(30) Foreign Application Priority Data

Nov. 6, 2015 (GB) .................................. 1519597.7

(51) Int. Cl.
*H04L 12/26* (2006.01)
*H04L 29/08* (2006.01)
(Continued)

(52) U.S. Cl.
CPC ............ *H04L 43/045* (2013.01); *H04L 67/04* (2013.01); *H04L 67/22* (2013.01); *H04L 67/36* (2013.01);
(Continued)

(58) Field of Classification Search
CPC ....... H04L 43/045; H04L 67/04; H04L 67/22; H04L 67/36; H04N 21/23418; H04N 7/181; H04N 7/18; G06K 9/00771
(Continued)

(56) References Cited

U.S. PATENT DOCUMENTS 9,106,475 B2 * 8/2015 Matsumura ....... H04L 29/06068
9,613,512 B2 * 4/2017 Williams ............... G08B 13/24
(Continued)

FOREIGN PATENT DOCUMENTS

WO    2005009022    1/2005
WO    2005019837    3/2005

OTHER PUBLICATIONS

Search Report for GB1519597.7 dated Mar. 24, 2016.
International Search Report for FCT/GB2016/053414 dated Feb. 28, 2017.

*Primary Examiner* — Girumsew Wendmagegn
(74) *Attorney, Agent, or Firm* — Christopher M. Scherer; DeWitt LLP (57) ABSTRACT

Improvements to network switches and other network components that enable improved status monitoring and logging of network and device parameters, particularly for networked video surveillance applications. The network switch or other network component, which may be an IP camera for example, outputs a networked video stream which contains graphical representations of relevant data, such as simple graphs or indicators. The networked video stream, and therefore the relevant data, can then be conveniently viewed and/or stored as a networked video stream with existing standard technology. An additional benefit is that conventional motion detection can be performed on the graphical representations in the networked video stream to generate alarms or trigger events.

21 Claims, 3 Drawing Sheets

(51) Int. Cl.
*H04N 7/18* (2006.01)
*H04N 21/234* (2011.01)

(52) U.S. Cl.
CPC ....... *H04N 7/181* (2013.01); *H04N 21/23418* (2013.01)

(58) Field of Classification Search
USPC ........................................................ 348/143
See application file for complete search history.

(56) References Cited

U.S. PATENT DOCUMENTS

| | | | |
|---|---|---|---|
| 2004/0075738 A1* | 4/2004 | Burke | G08B 13/19656 348/143 |
| 2005/0198247 A1* | 9/2005 | Perry | H04L 7/0008 709/223 |
| 2006/0037051 A1 | 2/2006 | McDowell et al. | |
| 2006/0075335 A1 | 4/2006 | Gloor | |
| 2008/0250356 A1 | 10/2008 | Johns | |
| 2011/0063211 A1 | 3/2011 | Hoerl et al. | |
| 2012/0314018 A1 | 12/2012 | Wengrovitz et al. | |

\* cited by examiner

NETWORK SWITCH

CROSS-REFERENCE TO RELATED APPLICATIONS

The present application is the U.S. national stage application of International Application No. PCT/GB2016/053414, filed Nov. 3, 2016, which international application was published on May 11, 2017, as International Publication No. WO2017/077303. The International Application claims priority to British Patent Application No. 1519597.7, filed Nov. 6, 2015, the contents of which are incorporated herein by reference in their entireties.

The present invention relates to the field of computer networking. More specifically, the present invention concerns improvements to network switches that enable improved status monitoring and logging. In a particular embodiment of the invention, a network switch is provided which enables improved status monitoring and logging in a networked video surveillance system.

BACKGROUND TO THE INVENTION

Most modern video surveillance systems now make use of networked video surveillance to some degree at least. Networked video surveillance, also termed video over IP (internet protocol) or IP-video, usually involves encoding or otherwise digitising video for transmission over a network—which is usually a local area network (LAN) such as an Ethernet network—to a central network video recorder (NVR) which records the video stream. The video stream, or in many cases video streams from different IP cameras, may also be decoded by video management software (VMS) and displayed on one or more monitors.

There are a number of technical challenges associated with the transmission of video streams over any network; particularly as in video surveillance applications it is crucial that the video stream is real-time. Packet loss presents one challenge which may be addressed by forward error correction or channel coding to avoid the need for resending packets.

Network delays also pose challenges; variations in network delay can cause video traffic following different packet routes to arrive out of sequence but this may be solved by buffering. However, buffering introduces a time delay which may adversely affect real-time monitoring. Alternatively, or additionally, video traffic can be prioritised within the LAN.

Addressing all of the above issues requires detailed knowledge of various parameters within the networked video surveillance system. In any case, monitoring such parameters provides a means of identifying, diagnosing and/or solving problems and faults within the networked video surveillance system. Monitoring these parameters is however not straightforward.

Simple Network Management Protocol (SNMP) management software may be used to monitor any network device provided with SNMP agent software. SNMP is used in many network environments to monitor routers, switches, servers, workstations, printers, modem racks and other devices on the network. An SNMP manager can obtain detailed information from SNMP agents including network statistics, device performance and usage statistics, device error and event messages and other hardware and software data.

While SNMP is intended to provide an internet standard protocol for managing devices on IP networks, there are a number of issues that particularly affect networked video surveillance applications. Implementations of SNMP tend to vary between platform vendors. Furthermore, despite SNMP's seemingly simple tree structure and linear indexing, it is not always understood well enough within the internal data structures that are elements of a platform's basic design. Processing SNMP queries on certain data sets may result in higher CPU utilisation than necessary.

In addition, some SNMP values—and in particular tabular values—require specific knowledge of table indexing schemes for example, and in any case these index values may not be consistent across different platforms or different devices. This can cause correlation issues when fetching data from multiple devices that may not employ the same table indexing scheme; for example when fetching disk utilisation metrics where a specific disk identifier is different across platforms.

Implementation of SNMP in a networked video surveillance application requires a separate monitoring system (the SNMP manager) which increases complexity and also increases cost. Furthermore, while SNMP is much used by IT departments it is generally understood that surveillance system integrators are not familiar with SNMP and in any case will not consider using SNMP because the SNMP output from most network switches will not provide information that is of specific relevance to the surveillance system. Furthermore, the users of such surveillance systems are very rarely IT experts let alone qualified in SNMP data and interpretation. In fact, surveillance system installers or integrators are typically security experts who have little understanding of networking technology.

Accordingly, it is an object of at least one aspect of the present invention to provide improvements in networked video surveillance applications that enable monitoring and/or of relevant information in an easily understandable and accessible form. These improvements may be employed in a network switch for networked video surveillance applications which embodies at least one aspect of the present invention.

Further aims and objects of the invention will become apparent from reading the following description.

SUMMARY OF THE INVENTION

According to a first aspect of the invention, there is provided a network switch for networked video surveillance applications, the network switch configured or adapted to determine one or more parameters, generate at least one image frame containing at least one graphical representation corresponding to the one or more parameters, and output a networked video stream comprising the at least one image frame.

As noted above, surveillance system integrators and users of such surveillance systems are very rarely IT experts let alone qualified in SNMP data and interpretation. However, they will be able to understand graphical representations of relevant data, such as simple graphs or indicators, and the invention enables the relevant data to be conveniently viewed and/or stored as a networked video stream with existing standard technology (i.e. networked video recorders and reviewing software). The parameters may include network parameters, and/or may include parameters relating to the network switch.

Most preferably, the network switch is configured or adapted to generate at least one image frame containing a plurality of graphical representations corresponding to the one or more parameters.

The at least one graphical representation may be selected from the group comprising text, graphs and status indicators.

Most preferably, the network switch may generate a sequence of image frames to generate the video stream. The network switch may generate the sequence of image frames at a predetermined frame rate. Additionally, or alternatively, the network switch may generate the sequence of image frames by periodically updating at least one graphical representation. The network switch may update the at least one graphical representation dependent on the corresponding one or more parameters.

Optionally, an image frame may comprise a first graphical representation and a second graphical representation. The first graphical representation and the second graphical representation may be updated simultaneously. Alternatively, the first graphical representation and the second graphical representation may be updated at different times, and/or at different frequencies.

Optionally, the network switch may output multiple networked video streams as separate channels, with each stream corresponding to one or more parameters.

Optionally, a graphical representation may be updated responsive to a change in the respective parameter.

Optionally, the network switch may generate a first image frame and a second image frame, wherein the first image frame and the second image frame contain different graphical representations. Optionally, the network switch may output a first video stream comprising the first image frame and a second video stream comprising the second image frame. Alternatively, the network switch may output a video stream comprising the first image frame and the second image frame. The video stream may alternate periodically between the first image frame and the second image frame.

Preferably, the network switch may be configured or adapted to compress the at least one image frame or sequence of image frames. The network switch may be provided with a compression algorithm to compress the at least one image frame.

Preferably, the network switch may comprise a processor which may be programmed to generate the at least one image frame. The processor may comprise an FPGA or a general purpose CPU.

Optionally, the processor may be further programmed to compress the at least one image frame and/or generate the networked video stream.

Preferably, the image compression algorithm may comprise a JPEG compression algorithm. Alternatively, the image compression algorithm may comprise an H.264 compression algorithm.

Alternatively, the network switch may comprise a further processor programmed to compress the at least one image frame and/or generate the video stream. The further processor may comprise a dedicated hardware compression processor.

Preferably, the network switch is configured or adapted to process the at least one image frame and/or the video stream to generate an ONVIF compatible video stream. Optionally, the generated ONVIF compatible video stream may comprise one or more alarms generated by the network switch.

Optionally, the processor may be programmed to determine the one or more parameters to be logged and output. Alternatively, or additionally, the network switch may comprise one or more sensors which may be adapted, configured or arranged to determine the one or more parameters. Alternatively, or additionally, the network switch may be configured or adapted to receive the one or more parameters from a networked device.

Optionally, the one or more parameters may be selected from the group comprising: Power over Ethernet (PoE) status, PoE power level, external connection and disconnection logs, software controlled resets of PoE power, instantaneous bit rate throughput, MAC addresses of connected devices, IP addresses of connected devices, collision detection status, CPU usage, memory status, total power consumption, on board temperatures, fan status, system uptime, system firmware version, alarm input/output, alarm notification status, link latency, link type, network cable length, NTP timestamp, NTP status, NTP source details.

Optionally, the one or more parameters may relate to one or more of the network switch or any connected device. The network switch may be configured or adapted to connect to one or more internet protocol cameras.

Preferably, the network switch may comprise a plurality of network ports. Preferably, the network ports may comprise Ethernet sockets, and may therefore comprise RJ-45 sockets. Alternatively, the network ports may comprise co-axial sockets, and may therefore comprise BNC connectors or mini-co-axial connectors.

Most preferably, the network switch may comprise a Power over Ethernet (PoE) module.

Preferably, the network switch may comprise an Ethernet transceiver.

Optionally, the network switch further comprises RAM.

Optionally, the network switch further comprises a clock source.

Optionally, the network switch may support NTP (Network Time Protocol) time synchronisation for the clock source.

Optionally, the network switch is configured or adapted to emulate one or more SNMP traps. The network switch may comprise corresponding physical alarm contacts.

Embodiments of the first aspect of the invention may comprise features corresponding to the preferred or optional features of any other aspect of the invention or vice versa.

Note that it is envisaged that the inventive concept embodied in the network switch of the first aspect may be employed in any network device. Accordingly, a second aspect of the invention provides a network device configured or adapted to determine one or more parameters, generate at least one image frame containing at least one graphical representation corresponding to the one or more parameters, and output a networked video stream comprising the at least one image frame.

Optionally, the network device may comprise a network switch. Alternatively, the network device may comprise a camera, which may be an IP camera.

Embodiments of the second aspect of the invention may comprise features corresponding to the preferred or optional features of any other aspect of the invention or vice versa.

According to an alternative aspect of the invention there may be provided a network switch or other network device for networked video surveillance applications, the network switch or network device configured or adapted to determine one or more parameters, generate at least one image frame containing at least one graphical representation corresponding to the one or more parameters, and output an analog video stream comprising the at least one image frame.

Embodiments of this alternative aspect of the invention may comprise features corresponding to the preferred or optional features of any other aspect of the invention, particularly the first or second aspect, or vice versa.

According to a third aspect of the invention there is provided a method of monitoring one or more parameters in a network switch for networked video surveillance applications, the method comprising determining the one or more parameters, generating at least one image frame containing at least one graphical representation corresponding to the one or more parameters, and outputting a networked video stream comprising the at least one image frame.

Most preferably, the method may comprise generating the networked video stream by generating a sequence of image frames. The sequence of image frames may be generated at a predetermined frame rate. Additionally, or alternatively, the sequence of image frames may be generated by periodically updating at least one graphical representation. The at least one graphical representation may be updated dependent on the corresponding one or more network parameters.

Most preferably, the method further comprises recording the video stream in a network video recorder. Alternatively, or additionally, the method further comprises recording the video stream on a hard disk or solid-state storage device. The video stream may be recorded sequentially.

Optionally, the method may comprise correlating one or more images from a video stream generated by an IP camera with one or more images from the video stream generated by the network switch. Information from the one or more images of the video stream generated by the network switch may be used to diagnose issues in the video stream generated by the IP camera.

Optionally, the method further comprises performing motion detection on the video stream generated by the network switch. Preferably, motion detection is performed on one or more graphical representations. Optionally, an alarm is generated responsive to a positive detection of motion in relation to one or more graphical representations.

The method may further comprise emulating one or more SNMP traps.

Embodiments of the third aspect of the invention may comprise features corresponding to the preferred or optional features of any other aspect of the invention or vice versa.

As above, it is envisaged that the inventive concept embodied in the method of monitoring one or more parameters in a network switch (particularly for networked video surveillance applications) may be employed in relation to any network device or indeed in any network. Accordingly, a fourth aspect of the invention provides a method of monitoring one or more parameters in a network, the method comprising determining the one or more parameters, generating at least one image frame containing at least one graphical representation corresponding to the one or more parameters, and outputting a video stream comprising the at least one image frame.

Optionally, the network may comprise a video surveillance network.

Preferably the method may comprise monitoring the one or more parameters in a network device. Optionally, the network device may comprise a network switch. Alternatively, the network device may comprise a camera, which may be an IP camera.

Embodiments of the fourth aspect of the invention may comprise features corresponding to the preferred or optional features of any other aspect of the invention or vice versa.

According to a fifth aspect of the invention, there is provided a network comprising one or more network switches according to the first aspect and/or one or more network devices according to the second aspect.

The network may comprise one or more network switches and may further comprise one or more IP cameras. The network may be a video surveillance network.

Preferably, the network may further comprise one or more network video recorders. Alternatively, or additionally, the network may comprise one or more hard disk storage devices or solid-state storage devices.

Optionally, the network may further comprise one or more video management systems.

Advantageously, a hard disk storage device or solid-state storage device of the network may be configured or adapted to record the video stream from the one or more network switches and/or one or more network devices independently of a video management system and/or network video recorder.

Embodiments of the fifth aspect of the invention may comprise features corresponding to the preferred or optional features of any other aspect of the invention or vice versa.

According to another aspect of the invention, there is provided a network switch substantially as described herein with reference to the drawings.

According to a further aspect of the invention, there is provided a method of monitoring one or more parameters in a network switch, substantially as herein described with reference to the drawings.

BRIEF DESCRIPTION OF THE DRAWINGS

Aspects and advantages of the present invention will become apparent upon reading the following detailed description and upon reference to the following drawings (like reference numerals referring to like features) in which.

DETAILED DESCRIPTION OF PREFERRED EMBODIMENTS

As discussed in the background to the invention above, existing networked video surveillance systems and methodologies do not enable monitoring and/or display of relevant information in an easily understandable and accessible form. Note that the term "networked video" used herein shall be understood to relate to networked video streams, for example in an RTSP or ONVIF format, which can be recorded by networked video recorders.

Figure 1:
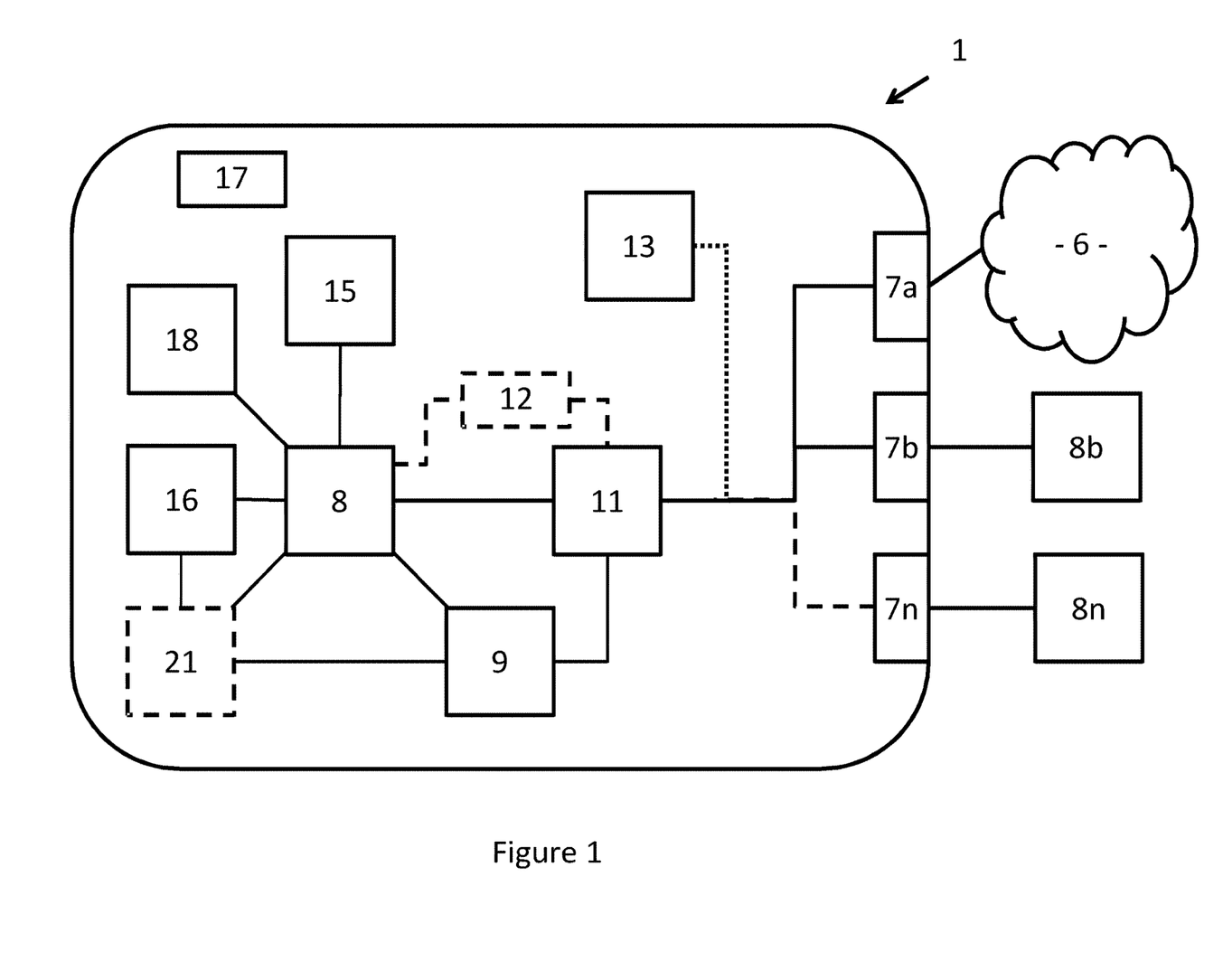
FIG. 1 is a schematic representation of a network switch according to an aspect of the present invention.
Figure 2:
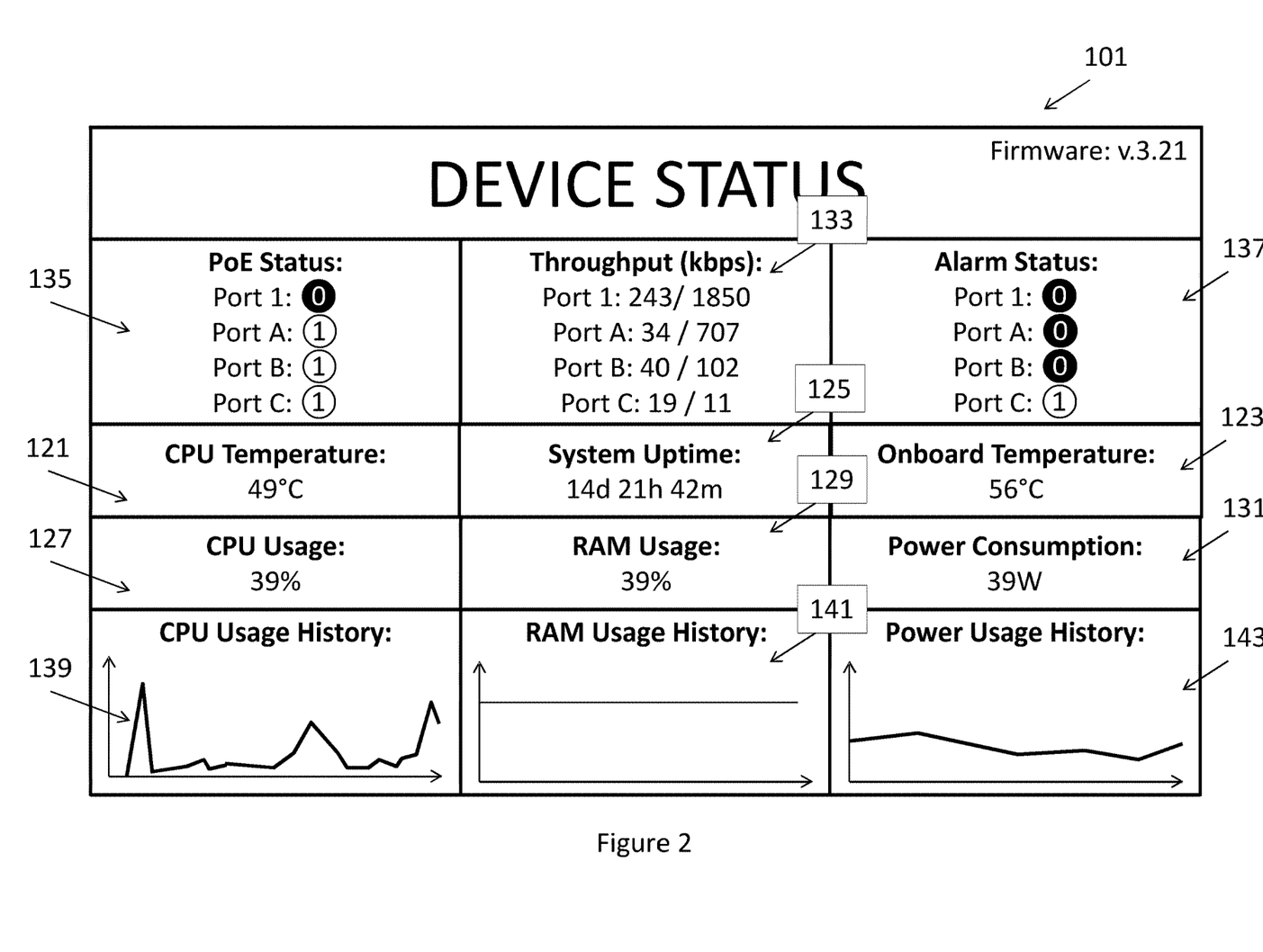
FIG. 2 illustrates an image frame from a video stream generated in accordance with an aspect of the present invention.
Figure 3:
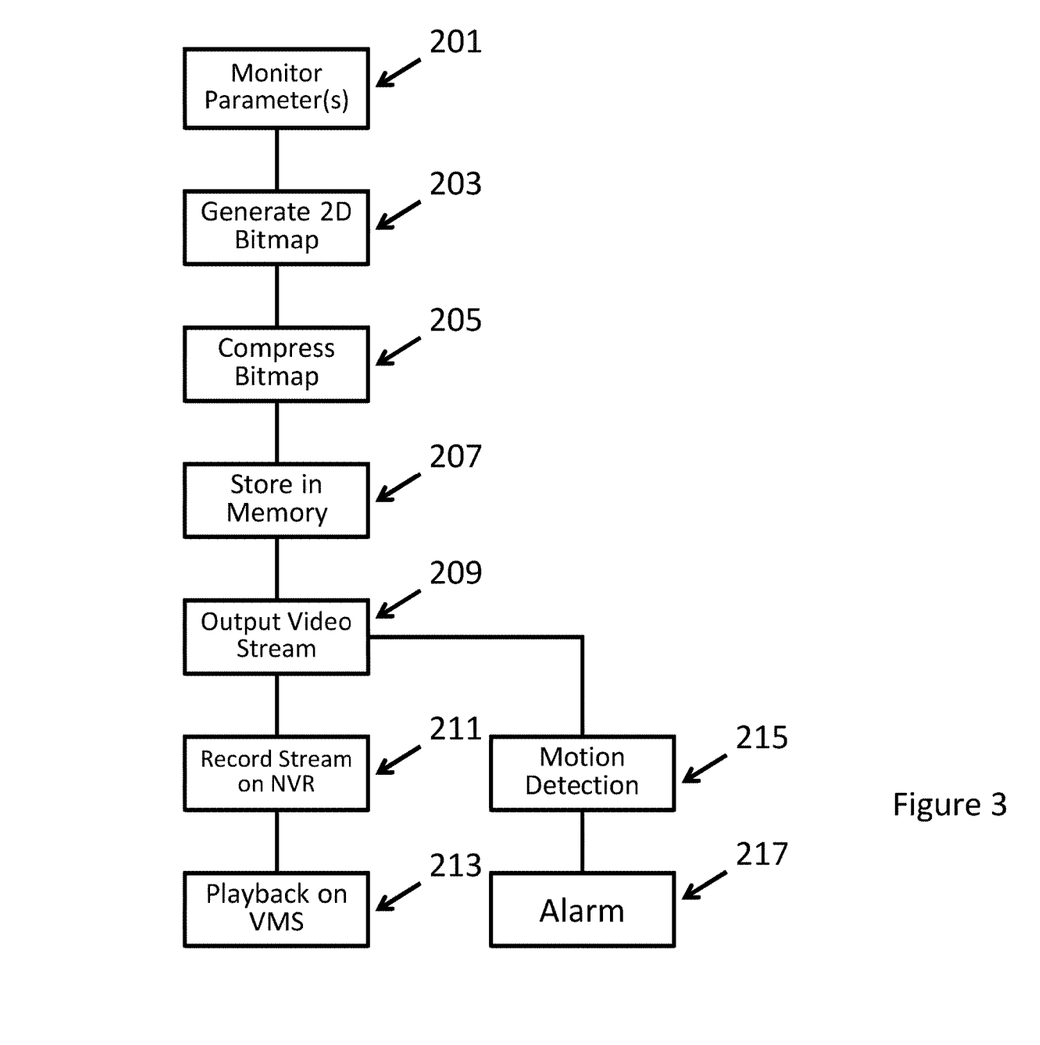
FIG. 3 is a flow chart which outlines a process of generating a video stream according to an aspect of the present invention.

An embodiment of the present invention is illustrated in FIG. 1 and overcomes this problem with the prior art as described with further reference to FIGS. 2 and 3. An improved network switch 1 can be seen to comprise a housing 3 within which is housed the various components of the network switch 1.

A number of network ports 7a-7n, which are RJ-45 Ethernet sockets in this embodiment, provide a means for connected devices 8a-8n to communicate on the network 6. In this example, the connected devices 8b-8n are IP cameras.

While LAN ports 7a-7n are described as being RJ-45 Ethernet sockets, any suitable network ports or interfaces may be employed. In an alternative embodiment the LAN ports may comprise BNC interfaces to connect with coaxial cable, for example to deliver a network connection over legacy analog cabling. Furthermore, while the connected devices 8a-8c are described as IP cameras, in truth any manner of networked device may be connected to the network switch 1.

The network switch 1 further comprises a CPU processor 8 and/or FPGA 9, which is programmed to control Ethernet switching and other functionality. The optional use of an FPGA allows reprogramming or upgrading to accommodate new features and functionality as well as the flexibility to support different ports and protocols. Existing Application Specific Standard Products (ASSPs), which may of course be used instead, are less flexible and are not extensible to support new capabilities. The network switch is also provided with RAM 15, flash storage 18 such as may be used for firmware upgrades or other temporary storage, and image RAM 16 specifically for image processing requirements.

An Ethernet switch controller 11 is provided to support 10BASE-T, 100BASE-T and 1000BASE-T Ethernet protocols and to implement 10/100/1000 MB/s Ethernet. The transceiver 11 comprises an integrated clock and can provide a synchronous Ethernet clock output. Alternatively, the network switch can be provided with a separate clock 12.

To support Power over Ethernet (PoE) the network switch 1 is provided with a PoE module 13 for PoE injection and control. The PoE module enables the switch 1 to provide electrical power to connected devices 8b-8n via Ethernet cables which connect them to the switch 1.

A temperature sensor 17 is provided which monitors the on board temperature. Individual components of the switch, such as the CPU 8, FPGA 9 or the Ethernet switch controller 11, may also be provided with integrated temperature sensors. Other sensors may be incorporated as required.

There are several parameters of the network switch 1 and of the connected devices 8b-8n that would be beneficial to monitor and record. These include:

PoE status (on or off) of each port;
PoE power level being delivered from each port;
External connection and disconnection log;
Software controlled resets of PoE power (to reboot camera remotely) per port;
Instantaneous bit rate throughput of each port (including uplink ports);
MAC addresses of connected devices;
IP addresses of connected devices;
Collision detection status;
CPU usage;
Memory status;
Total power consumption;
On board temperatures;
Fan(s) status;
System uptime;
System firmware version;
Alarm input/output (for surveillance switches in particular);
Alarm notification status from camera
Link status
Link latency
NTP status
NTP source in addition to many other parameters including those classed as "standard" within conventional SNMP monitoring procedures.

The CPU 8 and/or FPGA 9 is programmed to monitor all of the above parameters and convert the parameters into an internal 2-dimensional bitmapped graphical representation (image) which includes text, graphs and status indicators as appropriate. A single image 101, an example of which is shown in FIG. 2, is thus generated with all of the required data represented graphically. This contrasts with current approaches in which data may be logged in a database or text file or similar.

This single image 101 is updated on a frequent or infrequent basis dependent on the parameters and configuration of the system in which it is employed. For example, the temperature indicators 121, 123 may be updated every second whereas the system uptime indicator 125 may only be updated once a minute. Accordingly, the update frequency of each parameter may vary within the same image and therefore only that area of the image which requires to be updated or modified will be changed.

Of course each indicator may be updated at the same frequency in which case the entire image is updated at said frequency. However, it is less processor intensive to update at frequencies appropriate to each parameter.

The image 101 can be seen to include different types of indicator. For example, the CPU Temperature 121, System Uptime 125, Onboard Temperature 123, CPU Usage 127, RAM Usage 129, Power Consumption 131 and Throughput 133 indicators comprise primarily alpha-numeric information. The PoE Status 135 and Alarm Status 137 indicators comprise a combination of alpha-numeric information and graphical status indicators which indicate an "on" or "off" status. The CPU Usage History 139, RAM Usage History 141 and Power Usage History 143 are predominantly graphical indicators showing the relevant parameter as a function of time. Although related, the graphs may be updated at a different frequency than the corresponding indicator above. The status indicators 135, 137 may be updated responsive to a change of a relevant status; in other words these indicators may only be updated in the event of a change.

An individual image 101 therefore provides a snapshot of a variety of relevant system parameters at a particular time. In of itself this is a very useful tool which will enable even IT-illiterate users to quickly identify the presence of a fault or ongoing issue. Any combination of update schedules can be adopted by appropriate programming or option selection which the skilled person will readily understand how to implement.

In this example, the size of the image 101 is 1920×1080 pixels, or in other words HD resolution. Any appropriate resolution may be employed of course, but alternative embodiments may in practice conform to commonly used monitor or IP video resolutions such as 640×480, 1024×768, 1920×1200 and 3840×2160. At higher resolutions the update frequency may become more critical in terms of resource consumption.

The individual image 101 is treated by the FPGA 9 as an image "frame". This frame is then compressed using a conventional image compression algorithm such as JPEG and the compressed frame is then stored in RAM 15. This generation of compressed image frames can be performed at any frame rate but should be within the capability of the FPGA 9. By the resulting sequence of compressed images a video stream is generated which is further processed, or "wrapped" to use a term in the art, to form an ONVIF compatible video stream.

An ONVIF compatible compressed video stream can be recorded by an NVR and/or viewed on a client PC running suitable software capable of decoding and displaying an ONVIF video stream. Most current NVRs are now ONVIF compatible.

Note that the ONVIF standard includes a format or protocol for transmitting alarms in conjunction with networked video. Accordingly, it is envisaged that the network switch may transmit alarms with the video stream, such that any NVR (or VMS) fully supporting the ONVIF standard will be able to accept the alarms generated by the network switch and, for example, alert an operator for immediate action if appropriate.

Any image compression algorithm may be employed of course, and in an alternative embodiment of the invention a series of frames may be compressed using a differential compression algorithm such as H.264. Likewise, any other manner of video output may be employed. For example, it is also foreseen that the video stream may be output as a Generic Real-Time Streaming Protocol (RTSP) output which will be compatible with many surveillance recorders, for example when ONVIF is not present.

Shown in FIG. 1 is an optional dedicated hardware compression processor 21 which, instead of the CPU 8 or FPGA 9, compresses the image frames (using JPEG, H.264, or other appropriate compression). This arrangement increases speed, reliability and reduces load on the CPU 8 and FPGA 9. Similarly, hardware compression may be employed to generate the video stream in which case the CPU 8 and/or FPGA 9 chiefly generates the bit-mapped graphical representation of the relevant parameters.

In an alternative embodiment of the invention, a network switch generates different images which display different parameters, and each is used to generate its own video stream. Accordingly, more information than might be reasonably displayed on a single image can be recorded—this may be beneficial if the system in question employs lower resolution IP cameras and compatibility with IP camera video streams is desirable. The multiple video streams can be allocated or associated with unique IP addresses so as to resemble individual IP cameras on the network. It is also foreseen that the network switch could emulate a multi-stream device with a single IP address which can also be supported by NVR or VMS systems.

Put simply, the network switch of the present invention emulates one or more IP cameras so that the performance of the network and/or network switch can be recorded graphically by any existing network video recorder and accessed by any video management system, and avoids the necessity for a separate network management system.

In a further alternative embodiment of the invention, a single video stream may be generated by sequentially cycling through different images. In this embodiment it is advantageous to use a single-frame compression algorithm such as JPEG rather than a differential compression.

As described in the various embodiments envisioned above, a network switch according to the invention generates one or more video streams which may be recorded and viewed, either live or via playback from a recording. By presenting the parameters in a graphical form and so streaming this information in video format, the performance of the network switch (and other monitored parameters) can be viewed by any video management system (VMS) client and/or recorded by any network video recorder (NVR) without the need for additional integration or modifications. In fact, recording the performance of the network switch (and other monitored parameters) can be implemented as simply as registering a corresponding IP address in the VMS/NVR system configuration. As this is how IP cameras are installed this procedure can be carried out by systems installers without additional equipment or expertise.

An additional advantage lies in that it will be easy to correlate problems, issues or other anomalies in the performance of a video surveillance system (or any other network) by referring to the corresponding video stream generated by the inventive network switch. For example, it is foreseen that a video stream recorded from an IP camera can be viewed on one monitor while the network switch generated video stream(s) is (are) viewed on another monitor(s) simultaneously. An operator, without having to be IT-literate or otherwise skilled in networking or the SNMP protocol for example, can readily correlate any errors or issues with information which can be easily derived from the network switch generated video stream(s). This provides a useful diagnostic tool which can be used in real time or retrospectively by watching recordings of the respective video streams.

In addition, this recorded information can add credibility to any evidential video footage extracted from the system, for example to demonstrate that the surveillance system and/or the network was functioning normally and within limits during the relevant time period.

In an exemplary implementation of the network switch in a networked video surveillance system, an operator might notice that a video stream from a particular IP camera is no longer being received. By referring to the corresponding network switch generated video stream, he may be able to determine whether the IP camera itself has developed a fault (for example, if the PoE status of the relevant port suggests that the IP camera is not drawing power or is no longer connected), or whether network parameters indicate that the throughput of the network or network switch is such that the loss of video has resulted from bandwidth limitations.

As a case in point, IP camera images at night become noisier, harder to compress, output at a higher bit rate and so use higher network bandwidth. Video channels use extreme amounts of bandwidth even when operating in ideal conditions. If the system is operating at close to maximum throughput during the day it is reasonable to expect the network to jam up overnight with consequential loss of camera signals and hence surveillance recordings. An operator will be able to quickly identify and anticipate throughput issues using the present invention.

This functionality, enabled to a meaningful extent by the present invention, makes the job of a systems integrator and/or operator easier—particularly in the configuration and operation of larger systems where PoE power may be limited, network bandwidth may approach maximum limits and network data rates may vary significantly at different times of day.

Note that SNMP traps, which are used by devices to notify management systems of significant events, can be emulated by the switch—for example by physical alarm contacts. The emulated traps can indicate whether the relevant parameters cross a predetermined threshold or if a status should be a cause for alarm, for example, and these emulated traps can be connected to relevant alarm inputs of an NVR system (and associated with the relevant network switch).

An additional advantage is that video motion detection capabilities typical in NVR systems could be employed to monitor all or part of the network switch generated video stream(s). Individual indicators could be designed to change significantly in response to a trigger event and thus ensure reliable triggering of video motion detection alarms. This would not only remove the need for physical alarms altogether, and may also negate the need for any SNMP traps to be emulated (although it may be advantageous to retain both). This is a powerful tool and may enable alarm conditions to be set on parameters for which alarms are not typically enabled or available. In fact, any parameter represented in the network switch generated video stream(s) may be used to trigger an alarm.

Note that many VMS systems also have a post-recording "smart search" feature in which a designated area in a video channel is analysed for motion and/or changes during playback, so that recorded video can be processed at high speed and specific historical motion events can be highlighted to the reviewer for their further attention. When used with the network switch generated video stream(s) such a VMS system may therefore highlight alarms, events or major changes above thresholds in the parameters logged by the switch and represented graphically in the network switch generated video stream(s).

FIG. 3 is a flowchart summarising various stages in the operation of the present invention. As described above, one or more parameters are monitored 201 and a corresponding 2D bitmap is generated 203 which contains graphical representations of the monitored parameters. The bitmap can be generated by a suitably programmed FPGA for example. The bitmap is compressed 205, for example using a compression algorithm such as JPEG, and subsequently stored in memory 207. Note that the compression can be carried out by separate dedicated hardware. A video stream is then output 209 based on snapshots of the bitmap or compressed image at a predetermined frame rate. Again, the video stream can be generated by separate dedicated hardware. The video stream is recorded by a networked video recorder 211, which can be managed by a video management system or may be standalone. The recorded video stream can then be played back by a video management system or a VMS client 213.

Motion detection 215 can also be carried out on the video stream to identify changes in the graphical representation of one or more parameters (and hence identify changes in said parameter(s)) and an alarm generated 217 if appropriate.

The present invention has been described in the context of a network switch 1. It is however envisaged that the present invention may be embodied within an IP camera such that in addition to providing a video feed corresponding to images obtained from one or more optical sensors within the IP camera, diagnostic information about the camera and/or the network to which the IP camera is connected can be streamed by generating an additional video feed—or single, cycled, video feed—as described with reference to the network switch 1 above and its alternative embodiments. This may be particularly advantageous in applications such as the applicant's TRINITY™ system in which IP cameras record directly to their proprietary COLDSTORE™ sequential recording system thus eliminating the requirement for NVR servers.

In fact, the invention may be embodied within any component of any network, for example within network extenders, routers, network drives or other storage systems, etc. without departing from the spirit of the invention and/or the scope of the invention as defined by the appended claims. Accordingly, it will be understood that the invention extends to any network component, with those things having been changed which need to be changed as will be within the capability of the skilled person.

The invention provides improvements to network switches and other network components that enables improved status monitoring and logging of network and device parameters, particularly for networked video surveillance applications. The network switch or other network component, which may be an IP camera for example, outputs a networked video stream which contains graphical representations of relevant data, such as simple graphs or indicators. The networked video stream, and therefore the relevant data, can then be conveniently viewed and/or stored as a networked video stream with existing standard technology. An additional benefit is that conventional motion detection can be performed on the graphical representations in the networked video stream to generate alarms or trigger events.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims. For example, it is envisaged that the network switch might output an analog video stream comprising the at least one image frame

The invention claimed is:

1. A network switch for networked surveillance applications,
    wherein the network switch is configured to monitor and ascertain one or more parameters for the network switch,
    further wherein the network switch creates a two-dimensional bitmap consisting of at least one graphical representation of the at least one or more monitored and ascertained parameters,
    further wherein the network switch generates a sequence of image frames consisting of snapshots of the two-dimensional bitmap at a predetermined frame rate, and
    further wherein the network switch is configured to generate and output a networked video stream consisting of the sequence of image frames.

2. The network switch according to claim 1, wherein the network switch is configured to create a two-dimensional bitmap consisting of a plurality of graphical representations of the at least one or more monitored and ascertained parameters.

3. The network switch according to claim 1, wherein the at least one graphical representation is selected from the group comprising text, graphs and status indicators.

4. The network switch according to claim 1, wherein the network switch generates the sequence of image frames at a predetermined frame rate, by periodically updating at least one graphical representation dependent on the one or more network parameters.

5. The network switch according to claim 1, wherein a two-dimensional bit map comprises a first graphical representation and a second graphical representation, and wherein the first graphical representation and the second graphical representation are updated simultaneously, at different times and/or at different frequencies, dependent on the one or more network parameters.

6. The network switch according to claim 1, wherein the network switch outputs multiple networked video streams as separate channels, with each stream consisting of a two-dimensional bitmap consisting of one or more parameters.

7. The network switch according to claim 1, wherein a graphical representation is updated responsive to a change in the respective parameter.

8. The network switch according to claim 1, wherein the network switch generates a first image frame and a second image frame, wherein the first image frame and the second image frame contain different two-dimensional bitmaps, which contain different graphical representations.

9. The network switch according to claim 8, wherein the network switch outputs a first video stream comprising the first image frame and a second video stream comprising the second image frame, a video stream comprising the first image frame and the second image frame, or a video stream that alternates periodically between the first image frame and the second image frame.

10. The network switch according to claim 1, wherein the network switch is configured to compress the sequence of image frames using a compression algorithm such as a JPEG compression algorithm or an H.264 compression algorithm.

11. The network switch according to claim 1, wherein the network switch comprises a processor, such as an FPGA or a general purpose CPU, programmed to generate the sequence of image frames.

12. The network switch according to claim 11, wherein the processor is further programmed to compress the sequence of image frames and/or generate the networked video stream, or wherein the network switch comprises a further processor, such as a dedicated hardware compression processor, programmed to compress the sequence of image frames and/or generate the video stream.

13. The network switch according to claim 1, wherein the network switch is configured or adapted to process the sequence of image frames and/or the video stream to generate an ONVIF compatible video stream, wherein one of the one or more monitored and ascertained parameters for the generated ONVIF compatible video stream may comprise one or more alarms generated by the network switch.

14. The network switch according to claim 1, comprising a processor programmed to determine the one or more parameters to be logged and output, and/or comprising one or more sensors configured to determine the one or more parameters, and/or configured to receive the one or more parameters from a networked device.

15. The network switch according to claim 1, wherein the one or more parameters for the network switch may be selected from the group comprising: Power over Ethernet (PoE) status, PoE power level, external connection and disconnection logs, software controlled resets of PoE power, instantaneous bit rate throughput, MAC addresses of connected devices, IP addresses of connected devices, collision detection status, CPU usage, memory status, total power consumption, on board temperatures, fan status, system uptime, system firmware version, alarm input/output, alarm notification status, link latency, link type, network cable length, NTP timestamp, NTP status, and NTP source details.

16. The network switch according to claim 1, wherein the network switch is configured to emulate one or more SNMP traps, and wherein the network switch comprises corresponding physical alarm contacts.

17. A method of monitoring one or more parameters in a network device, such as a network switch for networked surveillance applications, the method comprising:
monitoring and ascertaining, by the network switch, the one or more parameters for the network switch;
creating, by the network switch, a two-dimensional bitmap consisting of at least one graphical representation of the one or more monitored and ascertained parameters;
generating, by the network switch, a sequence of image frames containing consisting of at least one snapshot of the at least one two-dimensional bitmap at a predetermined frame rate; and
generating and outputting a networked video stream comprising the sequence of image frames.

18. The method according to claim 17, further comprising recording the video stream in a network video recorder, a hard disk and/or a solid state storage device.

19. The method according to claim 17, comprising correlating one or more images from a video stream generated by an IP camera with one or more images from the video stream generated by the network switch, and optionally diagnosing issues in the video stream generated by the IP camera based on the one or more images of the video stream generated by the network device.

20. The method according to claim 17, further comprising performing motion detection on one or more graphical representations contained in the video stream generated by the network switch, and optionally generating an alarm responsive to a positive detection of motion in relation to one or more graphical representations.

21. A network, such as a video surveillance network, comprising one or more network devices according to claim 17, and optionally one or more network video recorders, hard disk storage devices and/or solid state storage devices.

* * * * *